United States Patent
Lu

(10) Patent No.: US 11,574,204 B2
(45) Date of Patent: Feb. 7, 2023

(54) INTEGRITY EVALUATION OF UNSTRUCTURED PROCESSES USING ARTIFICIAL INTELLIGENCE (AI) TECHNIQUES

(71) Applicant: ACCENTURE GLOBAL SOLUTIONS LIMITED, Dublin (IE)

(72) Inventor: Mingzhu Lu, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1028 days.

(21) Appl. No.: 15/833,974

(22) Filed: Dec. 6, 2017

(65) Prior Publication Data

US 2019/0171944 A1 Jun. 6, 2019

(51) Int. Cl.
*G06N 5/02* (2006.01)
*G06F 16/28* (2019.01)
(Continued)

(52) U.S. Cl.
CPC .......... *G06N 5/02* (2013.01); *G06F 16/285* (2019.01); *G06F 16/313* (2019.01); *G06N 5/022* (2013.01);
(Continued)

(58) Field of Classification Search
None
See application file for complete search history.

(56) References Cited

U.S. PATENT DOCUMENTS 6,598,043 B1 * 7/2003 Baclawski ............ G06N 5/022
7,840,455 B1 * 11/2010 Venkatasubramanian ...................
G06Q 40/12
705/30
(Continued)

FOREIGN PATENT DOCUMENTS

| CN | 107066599 A | 8/2017 |
| CN | 107077547 A | 8/2017 |
| WO | 2016130331 A1 | 8/2016 |

OTHER PUBLICATIONS

Indurthi, Sathish Reddy, et al. "Generating natural language question-answer pairs from a knowledge graph using a RNN based question generation model." Proceedings of the 15th Conference of the European Chapter of the Association for Computational Linguistics: vol. 1, Long Papers. 2017. (Year: 2017).*

(Continued)

*Primary Examiner* — Yongjia Pan
*Assistant Examiner* — Maria S Ayad
(74) *Attorney, Agent, or Firm* — Mannava & Kang, P.C.

(57) ABSTRACT

A process integrity evaluation system ensures integrity of unstructured processes. The process integrity evaluation system handles structured, semi-structured, and unstructured data at massive and large scale. The system provides scalability, secure storage, indexing, knowledge storage, and visualizations of processes by information retrieval, natural language processing, cloud computing, large scale machine learning, knowledge discovery, and other artificial intelligence techniques. Self-provided data, systematically gath- (Continued)

ered data, and potentially related data from additional sources are incorporated in the process integrity evaluation system which provides the core capabilities of data integrity checking, entity extraction, entity resolution, entity categorization, entity relationship extraction, processes extraction and reconstruction based on knowledge storage, such as knowledge graphs, inference functions, and evaluation computations. After extracting and reconstructing unstructured processes successfully, machine learning functions compute an integrity assurance score, e.g., a similarity, between extracted documents and the internal records in addition to an evaluation result, which can ensure the integrity of the unstructured processes.

18 Claims, 15 Drawing Sheets

(51) Int. Cl.
    *G06F 16/31*     (2019.01)
    *G06N 20/00*     (2019.01)
    *G06Q 10/06*     (2012.01)
    *G06K 9/62*     (2022.01)

(52) U.S. Cl.
    CPC ............. *G06N 5/025* (2013.01); *G06N 20/00* (2019.01); *G06K 9/6267* (2013.01); *G06Q 10/067* (2013.01)

(56) References Cited

U.S. PATENT DOCUMENTS

| | | | | |
|---|---|---|---|---|
| 8,438,089 | B1 * | 5/2013 | Wasserblat | G06Q 40/02 705/35 |
| 8,775,941 | B1 * | 7/2014 | Deshpande | H04L 67/02 715/736 |
| 10,311,442 | B1 * | 6/2019 | Lancaster | G06Q 99/00 |
| 10,489,466 | B1 * | 11/2019 | Zhang | G06F 16/285 |
| 10,585,877 | B1 * | 3/2020 | Casazza | G06F 16/80 |
| 2002/0184133 | A1 * | 12/2002 | Zangari | G06Q 40/06 705/36 R |
| 2007/0239636 | A1 * | 10/2007 | Tang | G06N 7/005 706/20 |
| 2011/0302117 | A1 * | 12/2011 | Pinckney | G06N 20/00 706/12 |
| 2012/0016878 | A1 * | 1/2012 | Peng | G06K 9/6239 707/737 |
| 2012/0029951 | A1 * | 2/2012 | Baluta | G06Q 40/02 705/4 |
| 2013/0231920 | A1 * | 9/2013 | Mathew | G06F 40/237 704/9 |
| 2014/0324517 | A1 * | 10/2014 | Harris | G06Q 10/0633 |
| 2015/0199515 | A1 * | 7/2015 | Qureshi | G06F 21/563 726/22 |
| 2015/0379346 | A1 * | 12/2015 | Newcomer | G06F 16/5866 382/229 |
| 2016/0098645 | A1 | 4/2016 | Sharma et al. | |
| 2018/0007053 | A1 * | 1/2018 | Grant | H04L 63/101 |
| 2018/0039695 | A1 * | 2/2018 | Chalabi | G06N 5/022 |
| 2018/0137420 | A1 * | 5/2018 | Byron | G06F 40/30 |
| 2018/0137775 | A1 * | 5/2018 | Byron | G09B 5/02 |
| 2018/0253657 | A1 * | 9/2018 | Zhao | G06Q 50/01 |
| 2019/0163818 | A1 * | 5/2019 | Mittal | G06F 40/247 |
| 2021/0158355 | A1 * | 5/2021 | Kramme | G06K 9/66 |
| 2021/0224275 | A1 * | 7/2021 | Maheshwari | G06N 3/084 |

OTHER PUBLICATIONS

Rakangor, Sheetal, and Y. R. Ghodasara. "Literature review of automatic question generation systems." International journal of scientific and research publications 5.1 (2015): 1-5 (Year: 2015).*

\* cited by examiner

From: "Mi Luck" miluck@exsale.com — 906
Date: 08-31-2014 — 908
To: Jane Gui janegui@usacc.com
Attach: ShiningSun 32 LED TV Markdown (9-1).xlsx
Subject: ShiningSun 32" LED CTV Price Amendment Request — 910

Jane,

Following-up on below email, effective 9/1 we are marking down USACC's ShiningSun 32" LED TV (ZZF320EM4/#551142030) inventory $7.00/unit and the lower pricing FOB $159.80 is effective from all new orders created 9/1 going forward. Amendment Contract Please issue a coop for $1,800,800.00 at your earliest convenience, and we will approve. Reminder, please mark check for payment method.

If there are any questions, please let us know.
Thanks,
*Mi Luck*

From: Jane Gui janegui@usacc.com
Date: 08-31-2014
To: Mi Luck miluck@exsale.com
Subject: ShiningSun 32" LED CTV Price Amendment Request Mi,
Our staff checked the inventory, and the product ShiningSun 32" LED TV SKU #551142030 has 1000 in-store 1000 warehouse, 500 in-transit, and 500 in Return center. Per your request, the price is lowered to $159.8 per unit effective on 9/1.

Also, the contract has been amended per your request, and we issued a coop for $1,800,800.

I indeed have questions, and will follow up later on.

Jane

*FIG. 9B*

| | | |
|---|---|---|
| Sender | Mi Luck | |
| Recipient | Jane Gui | |
| Date | 08-31-2014 | |
| Sender Company | exsale | |
| Receiving Company | usacc | |
| Product Name | ShiningSun 32" LED TV | |
| Product Sku | 551142030 | |
| Product Model | ZZF320EM4 | |
| Effective date | 09/01 | |
| Price Delta | $7 | |
| Lowered price | $159.8 | |
| Amendement Contract | contract | |
| Issue a coop | $1,800,800 ─ 1004 | |

↖ 1000

↙ 1002

| | |
|---|---|
| Sender | Jane Gui |
| Recipient | Mi Luck |
| Date | 08-31-2014 |
| Sender Company | usacc |
| Receiving Company | exsale |
| Product Name | ShiningSun 32" LED TV |
| Product Sku | 551142030 |
| In-store | 1000 |
| warehouse | 1000 |
| In-transit | 500 |
| Return center | 500 |
| Lowered price | $159.8 |
| Effective Date | 09/01 |
| Contract | amended |
| Issued a coop | $1,800,800 ─ 1054 |

| SKU | In-store | Warehouse | In-transit | Return Center | Old Price | New Price | Difference | Total Units | Total Due |
|---|---|---|---|---|---|---|---|---|---|
| 551142030 | 1000 | 1000 | 500 | 500 | 166.8 | 159.8 | 7.0 | 3000 | 21,000 |

INTEGRITY EVALUATION OF UNSTRUCTURED PROCESSES USING ARTIFICIAL INTELLIGENCE (AI) TECHNIQUES

BACKGROUND

Ensuring process integrity includes having accurate and consistent processes, information, and policy which require comprehensive control (including internal and external auditing). If the process is a structured process with well-defined process steps that a computer system is trained to identify, the information within the documents produced or modified at the different process steps can be automatically verified. Auditing of unstructured business processes, however, potentially requires labor intensive efforts to go through the related materials from the different data sources. The data sources may be of various editable or non-editable formats such as but not limited to, word processing documents, spreadsheets, images, or a document including information presented in various data types such as but not limited to a document that includes text data type along with tables, audio files, images and the like embedded therein. Accordingly, existing process integrity analysis may rely on intuitive human judgment and knowledge, which can be inaccurate, inconsistent and inefficient.

BRIEF DESCRIPTION OF DRAWINGS

Features of the present disclosure are illustrated through examples shown in the following figures. In the following figures, like numerals indicate like elements, in which:

FIG. 9A shows processing of an email from the product supplier to a product seller/recipient in accordance with the methods disclosed herein.

FIG. 9B illustrates processing of a response email from the product seller to the product supplier in accordance with the methods disclosed herein.

FIG. 10 shows the data structures that are obtained by analyzing the emails in FIGS. 9A and 9B in accordance with the methods disclosed herein.

FIG. 12 shows an example data structure that includes final extracted results in accordance with examples discussed herein.

DETAILED DESCRIPTION

Figure 1:
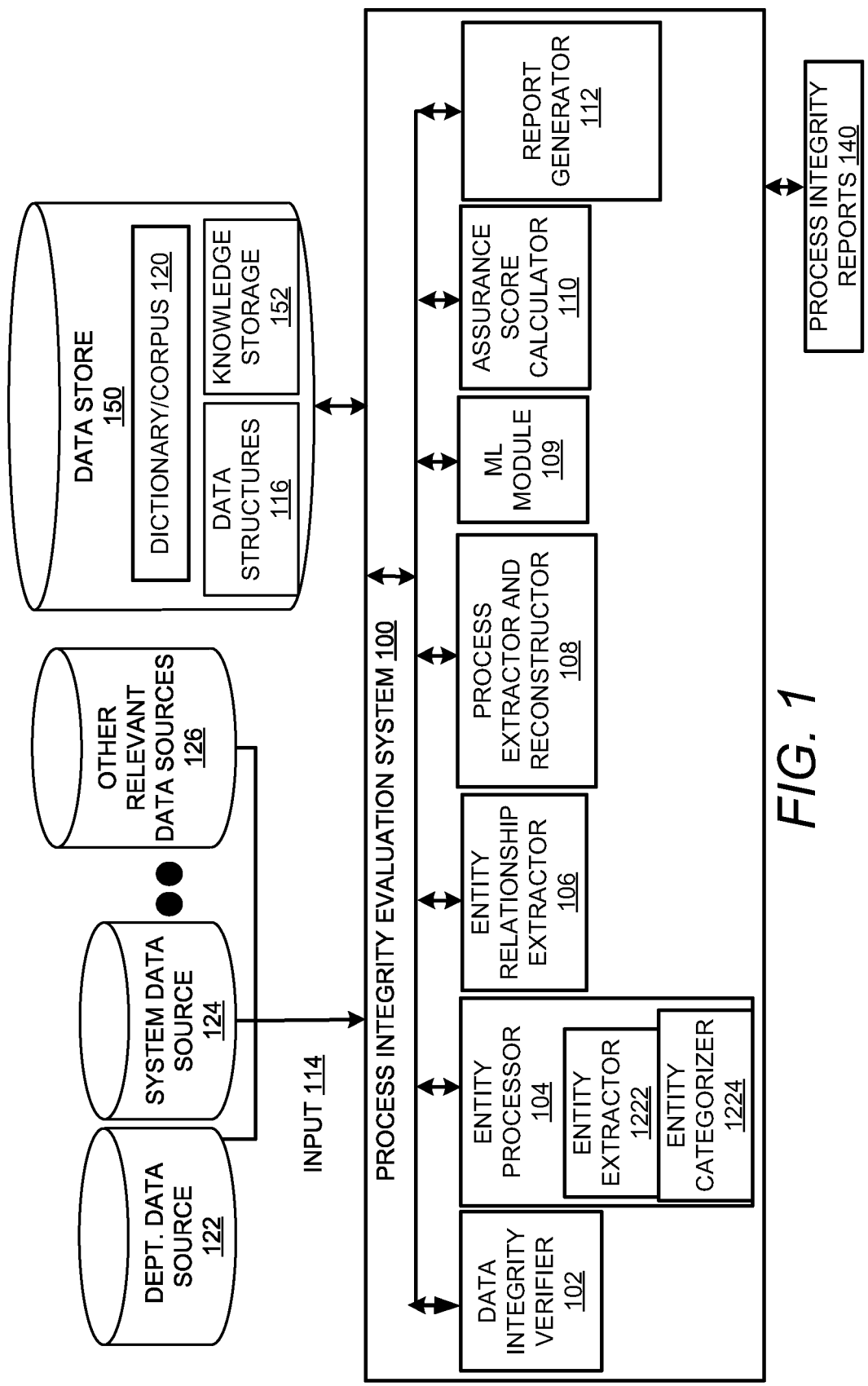
FIG. 1 illustrates a block diagram of a process integrity evaluation system that audits unstructured processes in accordance with examples described herein.

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on, the term "based upon" means based at least in part upon.

This disclosure enables ensuring the integrity in unstructured processes which process structured, semi-structured, and unstructured data at massive and large scale. The system accesses an input that is related to the unstructured process. After passing the data integrity verifier, documents associated with the input are parsed to extract the entities that participate in the unstructured process along with values of the entities. After recognizing the entities and identifying their values, entity resolution is applied across the documents to resolve the entity conflicts. The entities and the values that are extracted are categorized into one or more entity categories and stored in data structures which enable to building knowledge storage (including knowledge graphs, rules, and models). AI techniques (including Graph Computation, Tensor Factorization, and Link Prediction), can be used to reconstruct the unstructured process based upon knowledge storage, including knowledge graphs, rules, and models. An integrity assurance score or a similarity score is computed based on the similarity of the information obtained from the knowledge storage and the corresponding information obtained from the data sources that are associated with various steps of the unstructured process. A determination regarding the integrity or consistency of the unstructured process is obtained based on a comparison of the integrity assurance score with an assurance score threshold, which can be predetermined, optimized by the cross validation, or trained by models, etc. Finally, the process integrity report is generated, which includes the integrity assurance score and evaluation results.

An unstructured process is a complex, unpredictable process wherein the process steps remain uncertain prior to the completion of the process as the process steps involve decision taking, discussion and/or collaboration. Thus, the activities needed to complete the unstructured process are not known prior to the completion. Rather, the course of the unstructured process is determined by results that occur during the execution of the process. The process integrity evaluation system initially receives or accesses an input that pertains to an unstructured process that is currently in progress or which has been completed. The input can be an input that programmatically triggers an auditing/evaluation procedure of the unstructured process. In an example, the input may include data that is generated, modified or otherwise accessed during the course of the unstructured process through a number of communication channels such as but not limited to emails, mails, voice communications, chats, instant messages (IMs) and the like. In an example, the input can include one or more documents, database files, images, a videos or audio files that are generated and finalized at the conclusion of the unstructured process. Moreover, the input may include information in various formats including text, spreadsheet, tables, PDFs, and the like.

An entity represents an element of the unstructured process that either triggers steps/events or otherwise participates in the unstructured process or a component that is transformed or changed during the unstructured process. The entity can be characterized by or can maintain connections with various attributes which take different values. The entity extractor parses, tags (Part of Speech-POS), lemmatizes, and tokenizes the input to identify and recognize the entities involved in the unstructured process along with at least a subset of the attributes and attribute values. The entity resolution across the document is conducted after the entity extraction and recognition. To categorize the entities into corresponding categories (including location, person name, organization name, etc.), the extracted entities are processed by entity categorizers, which are normally trained classifiers that identify the entities and the entity values. The trained classifiers include classification algorithms/models, clustering algorithms/models, and rule-based categorizers, which may be trained using labelled data, unlabeled data, or semi-labelled data. The entities and the entity values thus collected can be stored in one or more data structures.

An entity relationship extractor accesses information from the data structures to build knowledge storage, where the knowledge storage can be in any format, including but not limited to knowledge graph, rules, models, or any other data storage formats. In an example, techniques such as but not limited to machine learning (ML) and natural language processing (NLP) are employed to obtain collections of entities and relationships between the entities. For example, entities can be identified from the tokens by comparing the tokens with contents of a dictionary or corpus. The dictionary can include a collection of target entities and similarity measures between the various tokens and the collection of target entities may be used in string identification. In addition, techniques such as but not limited to tensor factorization can be employed for predicting the links between the entities thereby completing the knowledge storage, where knowledge graphs are shown in the example. In this disclosure, a knowledge graph is a knowledge storage format. Knowledge graphs are large networks wherein the nodes of the networks represent the entities and the edges of the graphs represent the relationships between the entities. A process extractor and reconstructor accesses the knowledge storage to reconstruct the unstructured process. In particular, the process extractor can extract information from the knowledge storage (knowledge graphs) in order to obtain responses to queries including who, where, what, when and the like. The process extractor can trace the various steps and the various documents/step artifacts that were generated, modified or accessed during the course of execution of the unstructured process using the metadata of the step artifacts such as but not limited to the date and time of generation, access or modification in systemically generated data sources.

An assurance score calculator accesses the final document or the final data structure to validate the unstructured process. An integrity assurance score or a similarity score between the final document and internal records which can include the data sources are evaluated by the assurance score calculator. The integrity assurance score is compared with an assurance score threshold (which may be a threshold similarity score in some examples). The comparison enables determining the result of the audit of the unstructured process. If the integrity assurance score is above the assurance score threshold, the integrity of the unstructured process is assured. If the integrity assurance score is below the assurance score threshold, the unstructured process is flagged for further review with primary reasons (such as but not limited to inaccurate, inconsistent, or insufficient info etc. when compared to the internal records) in specific areas.

Various types of processes executed by computer systems include structured processes and unstructured processes. Most commercial, large scale computer systems such as but not limited to Enterprise Resource Planning (ERP) or Customer Relationship Management (CRM) systems are configured to handle structured processes with well-defined process flows. However, unstructured processes are dealt with in a non-obvious manner by manually recording and/or verifying the process data and communications of the process-participants through emails, phone calls or other communication channels. Hence, there is a likelihood that not all information is recorded and/or verified during the execution of the unstructured processes which necessitates painstaking manual labor to audit the unstructured process to ensure process integrity and consistency. The process integrity evaluation system disclosed herein provides a technical solution to a technical problem of data recordation and multi-source, cross-channel verification during an unstructured process as unstructured processes are difficult to model in computer systems. The process integrity evaluation system includes core capabilities of unstructured text mining, entity extraction and categorization, entity relationship extraction, process reconstruction and ML algorithms to consolidate the procedure. Recent advances in cognitive computing technologies are leveraged to make integrity assurance processes such as but not limited to auditing more accurate thereby achieving operational efficiency.

This disclosure has wide applications in areas, including but not limited to commercial sectors, consumer sectors, healthcare sectors, education sectors, and government compliance for integrity assurance and evaluation of processes and complex knowledge like policies, regulations, contracts, negotiations, and science procedures, etc.

FIG. 1 illustrates a block diagram of a process integrity evaluation system 100 for verifying integrity of unstructured processes in accordance with examples described herein. The process integrity evaluation system 100 can be executed by a computing apparatus that includes a processor coupled to a data store 150 as detailed further herein. The process integrity evaluation system 100 includes a data integrity verifier 102, an entity processor 104, an entity relationship extractor 106, a process extractor and reconstructor 108, a machine learning module 109 which includes but not limited to graph inference algorithms and similarity computation, an assurance score calculator 110, and a report generator 112. The process integrity evaluation system 100 may also be coupled to a data sources which can include but are not limited to departmental data source(s) 122, system data source(s) 124 and other additional relevant data source(s) 126 which can be used for process integrity evaluation purposes. Departmental data source(s) 122 includes databases and other data stores associated with specific departments of the organization that input data or receive data from one or more of steps of the unstructured process being evaluated. System data sources 124 include stores of systematically gathered data including email archives, user/system activity logs, data backups and the like that collect and store user and system activity data. Additional data sources 126 can include data sources associated with users such as but not limited to user/client devices, publicly accessible data sources such as those from the internet and the like. The data sources 122-126 may include structured and unstructured data sources, such as but not limited to, collections of documents including one or more of text files, spreadsheets, word processor files, presentations, image files, videos, sound files and the like. One or more of the data sources 122-126 can also include semi-structured data such as but not limited to Extensible Markup Language (XML) or Resource Description Framework (RDF) and the like. The data store 150 can be used to store data structures 116 that are employed during the evaluation procedures. Besides historical data, the process integrity evaluation system 100 may also employ real-time data or live streaming data, and the like for evaluating the integrity of unstructured processes. The data is not limited to historical data, but may also include real-time data or live streaming data, etc.

An unstructured process is a process that occurs in a non-obvious manner that can include various interactions that occur during the course of one or more entities (such as organizations, companies, representatives, etc.) executing the functions. In an example, the unstructured process may be a one-time process or a process that occurs infrequently. In an example, the unstructured process can be initiated either as part of a periodic process which occurs daily, weekly, bi-weekly or yearly or a process that occurs frequently but not periodically, In any case, the process integrity evaluation system 100 can be configured to evaluate the unstructured process based on the data that is generated, edited or otherwise accessed during the execution of the unstructured process, Examples of unstructured processes can include without limitation, a process for auditing departmental data such as financial reports or inventories, a contract negotiation process, a process for implementing price discounts, customer refunds or other marketing schemes, a process of instituting new policies or procedures within an organization and the like, Various communication channels such as but not limited to, emails, chats, IMs, offline communications such as hard copies of documents exchanged personally or via mail and the like can be employed to send or receive data in the unstructured process. As a particular flow is not pre-determined for the unstructured processes, the process integrity evaluation system 100 is configured to identify the process steps of the unstructured processes, The output of the process steps is audited in order to evaluate the unstructured process thereby ensuring that that the unstructured process or the data accessed, created, or modified during the unstructured process is not tampered with.

The unstructured process can be initiated or activated by different functions such as but not limited to, receipt of an email, saving of a finalized document to the data store 150, modification of one or more values within the data sources 122-126, a configured system function that initiates the unstructured process such as but not limited to an audit procedure or a procedure to initiate a customer refund and the like. In an example, an input that initiates the unstructured process may be referred to as an input 114. For example, the input 114 can be an email regarding a discount scheme on an item that is initially received and saved to one of the data sources 122-126, such as but not limited to an email archive. In another example, the input 114 can be a step artifact associated with the unstructured process which occurs at the beginning, during the unstructured process, or at the conclusion of the unstructured process. The unstructured process may include partially obvious or non-obvious sub-processes or nested processes. In an example, upon completion of the unstructured process associated with the discounted scheme, the process integrity evaluation system 100 is to verify the integrity of the unstructured process namely the discount scheme. The process integrity evaluation system 100 achieves this by, for example, one or more of verifying the items sold under the scheme via checking inventory data to obtain the amount of sales in terms of currency or volume, by auditing the financial transactions and by ensuring that the discount scheme was implemented as agreed upon through verification of the sales and/or inventory numbers against the manufacturer/retailer contract and the like. In accordance with some examples, the input 114 can include documents or other input having data formats associated with the data sources 122-126 such as but not limited to, one or more of image files, word processor files, text files, tables from databases, spreadsheets, emails, audio or video files and other files which may include one or more of structured, unstructured or semi-structured data.

When the integrity of an unstructured process is to be verified, the input 114 is initially received by the process integrity evaluation system 100 from one or more of the data sources 122-126 or an external system such as but not limited to an auditing application executed by a disparate machine. The input 114 that is received or other data associated therewith can be put through a data check by the data integrity verifier 102 that ensures that data received in the input 114 is accurate without errors or manipulations via checking multiple sources, or via cross-channel verification, or via outlier detection techniques, etc. For example, if a document in the input 114 is received from a departmental data source 122, the data integrity verifier 102 can configured to access at least another additional data source from the other relevant data sources 126 that store copies of the same document for the data integrity check. The data integrity verifier 102 may also be configured for other checks such as but not limited to data reasonability check and outlier detection wherein the data in the input 114 is checked to ensure that the data lies within specific data ranges and any data outliers are identified and flagged. If the data in the input 114 fails the data integrity check, further processing by the process integrity evaluation system 100 can be aborted and a report to this end is generated. If the data in the input 114 is verified, the input 114 is transmitted for further processing by the data integrity verifier 102.

The entity processor 104 is configured to retrieve entities along with their respective attribute values included within the input 114. For example, if the input 114 pertains to an unstructured process of instituting a discount on a product, the values for the entities retrieved from the input 114 may include but are not limited to, the name of the product, a product id, the original price, the percentage of discount, the discounted price, the time period during which the discount is offered and the like. The entity extractor 1222 analyzes the documents/data in the input 114 in accordance with examples discussed herein to retrieve the values of the entities. In an example, certain values of one or more of the entities may not be included in the input 114, in which case the default values included in one of the data sources 122-126 may be used. The values of the entities thus retrieved may be saved to the data store 150 for further processing. The entity categorizer 1224 accesses the values of the entities to classify them into one or more of the entity categories which include but are not limited to, location, person name, organization name, dates, logo images, prices, and the like.

In an example, natural language processing (NLP) techniques and Artificial Intelligence (AI) tools can be employed in identifying the entities from the input 114. Techniques associated with ensemble learning framework such as but not limited to, one or more of supervised or unsupervised learning, topic modelling and random forests can be used for entity categorization. The input 114 may be initially parsed and tokenized. AI tools such as but not limited to trained classifiers included in the entity categorizer 1224 process the tokens to identify the textual and non-textual data therein which can include name such as people or organization names, locations, dates, prices, product images, logo images, and the like. In an example, entities can be recognized by context enrichment techniques which utilize localized background of the entities in the input 114. The output including the entities and their respective values obtained by the entity processor 104 can be stored as one or more data structure(s) 116 within the data store 150. In an example, the data structures 116 can be a table or spreadsheet which stores the retrieved information. Other data structures such as but not limited to, flat files, comma separated values (CSV) files, a database and the like may also be used as the data structures 116 that store information extracted from the input 114.

Based on the collection of entities identified from the input 114, the unstructured process which the input 114 pertains to or refers to can be outlined. For example, an unstructured process such as but not limited to a rental contract negotiation may have entities like property owner name, renter's name, lease amount, lease period, terms of the lease agreement and the like. Another unstructured process such as a discount on a product may have entities such as product name, product SKU, original price, discount percentage, final price, discount period and the like. The entities associated with the discount program may correspond to field names in an inventory database. Of course, further details such as but not limited the relationships of between the entities and process steps are gathered as detailed herein for integrity check and scoring of the unstructured process.

The entity relationship extractor 106 receives information regarding the entities identified by the entity processor 104 and determines the relationship between the various entities using link prediction methodologies such as but not limited to tensor factorization. Upon the relationships between the various entities being established, the entity relationship extractor 106 stores the information regarding the entity links in the form of a representation such as, knowledge storage 152 such as but not limited to, knowledge graphs. In an example, the entity relationship extractor 106 can be configured to identify entity relationships such as but not limited to, is employed by, is a subcategory of, is reporting to, is purchased by, is returned by, was sent on or was received on and the like. It may be noted that specific entity relationships are based on a particular unstructured process being evaluated so that different unstructured processes may have different entity relationships to establish and the entity relationship extractor 106 is configured to extracting entity relationships for such varied unstructured processes. The process extractor and reconstructor 108 is configured to determine or reconstruct the process steps of the unstructured process based on the information obtained from or with the aid of the input 114 and stored in the knowledge storage 152. The information used to reconstruct the process steps may include but is not limited to, the entities and the relationships between the entities. In an example, AI techniques including long short-term memory (LSTM), neural nets or other techniques can be employed for the process reconstruction. The process extractor and reconstructor 108 can be configured to determine answers to one or more of selected queries such as but not limited to when, where, what, who, why and the like from the knowledge storage 152 thereby reconstructing the unstructured process. In an example, the links may be analyzed in a temporal sequence for tracing the steps of the unstructured process and the input/output data or step artifact at each process step may be verified based on the requirements associated with the process integrity evaluation.

Machine learning 109 may include a module including AI or ML functions to train and build algorithms/models to compute. In an example, the unstructured process can be evaluated by estimating an integrity assurance score which is indicative of the document similarity between internal records and the values of one or more of the entities extracted from the knowledge storage 152. The integrity assurance score thus obtained by the assurance score calculator 110 enables determining the result of auditing the unstructured process. The unstructured process is thus automatically audited based on the value of the integrity assurance score. In addition, normally a process integrity report is generated with the evaluation results. For example, if the integrity assurance score is below the threshold, the process integrity report will include the primary reasons in specific areas. The process integrity evaluation system 100 therefore ensures that the unstructured process and the data accessed, generated or modified during the unstructured process is consistent and not tampered based on a multi data source comparison.

In an example, a report generator 112 is included in the process integrity evaluation system 100. The report generator 112 is to apply the artificial intelligence techniques (including documents similarity computation, inference algorithms, computational reasoning, and graph computation) to generate the process integrity reports 140. The process integrity reports 140 includes information regarding the accuracy of entity values based on the results from the assurance score calculator 110. Various process integrity reports such as but not limited to accurate inventories, consistent budget accounts, cashflow numbers, inconsistent purchase and refund history and reasons thereof such as but not limited to price or cost overcharges, promotional off-invoices, price protection, rebates and the like. In addition to generating reports on specific unstructured processes, the report generator 112 may be configured to generate reports that show performance statistics of the process integrity evaluation system 100. For example, the report generator 112 can aggregate the number of process integrity evaluation tasks handled by the process integrity evaluation system 100, the number of unstructured processes that were determined to be valid, the number of unstructured processes that were flagged for further processing when the entity values were found to be inconsistent and the like. Technologies such as but not limited to Apache Zeppelin are used by the report generator 112 for generating the various reports.

The process integrity evaluation system 100 as outlined herein enables verifying integrity, consistency and accuracy of unstructured processes based on the information retrieved from the data sources 122-126. In addition, the process integrity evaluation system 100 conducts multiple source and cross-channel consolidation of data. The process integrity evaluation system 100 therefore provides for double checking and validating front office and back office operations, consolidations of the mailed documents with those exchanged by emails and cross-checking internal operational cash flows and the reported cashflows.

Figure 2:
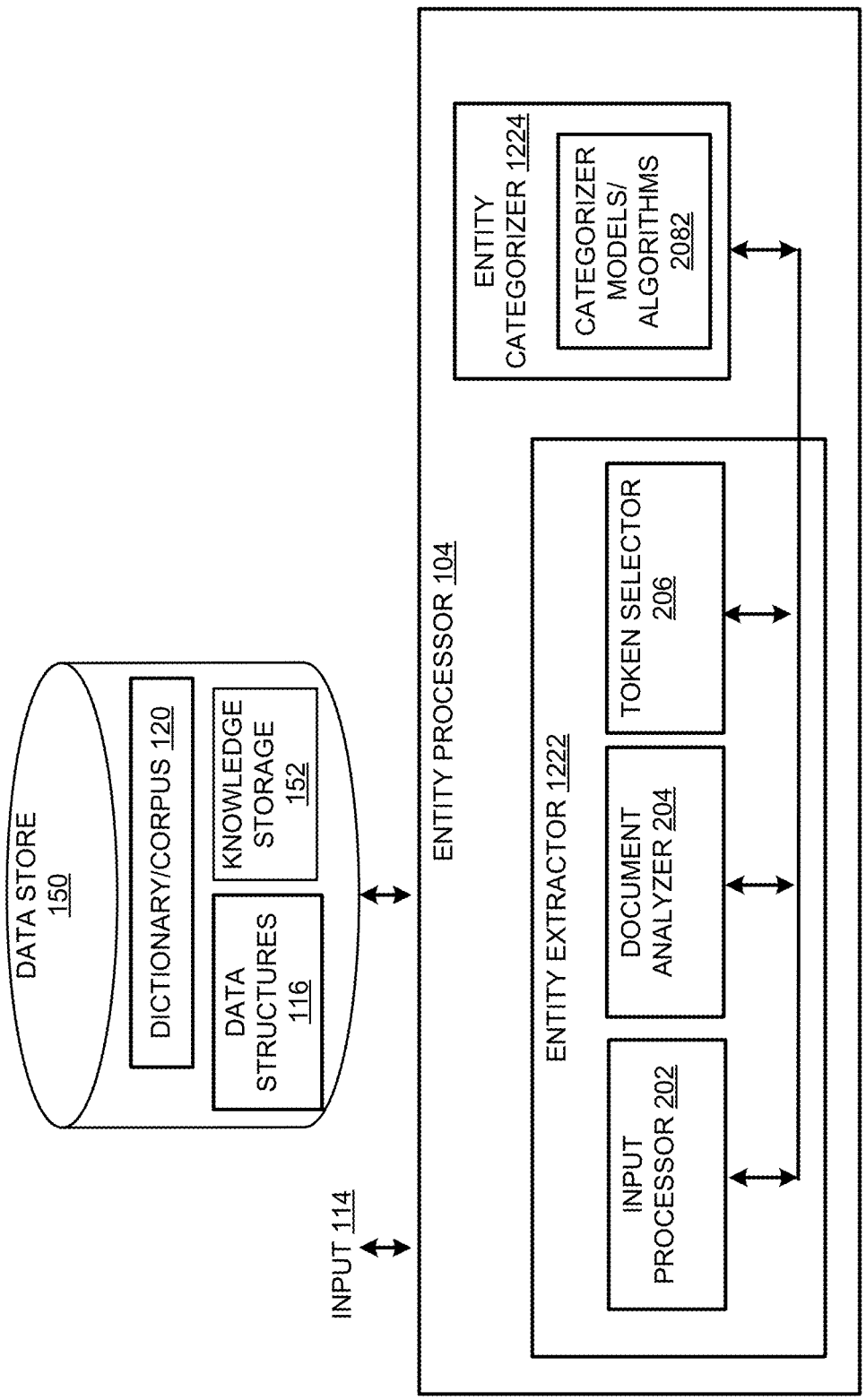
FIG. 2 shows a block diagram of an entity processor in accordance with the examples described herein.

FIG. 2 shows a block diagram of the entity processor 104 in accordance with the examples described herein. The entity processor 104 accesses the input 114 and obtains information regarding the entities associated with the unstructured process being evaluated. The entity extractor 1222 includes an input processor 202 which accesses the documents that may be associated with the input 114 and extracts the necessary document information or document metadata. Various kinds of documents such as but not limited to, emails, word processor documents, spreadsheets, presentations, database files, flat files and the like may be processed by the input processor 202. The input processor 202 may be configured to identify the various documents based on the metadata of the document, such as but not limited to, file extensions. Depending on the file extensions, the input processor 202 can be configured to process different documents according to different procedures. Information retrieval (IR) techniques which include frame-based information extraction procedures that enable automatic extraction of information from structured or unstructured machine-readable documents may be employed. For example, if the input 114 provides an email, the input processor 202 may be configured to examine the document metadata including the structure of the email header, subject line, recipients and body, and attachments to the email. Similarly, the input processor 202 includes mechanisms to process various other types of communications including chats, IMs, voice or video calls, or scanned offline communications such as but not limited to paper documents received via mail and the like can be analyzed and any media such as images, audio or video files that may be embedded therein may also be extracted.

The document analyzer 204 includes a document parser, part of speech (POS) tagger, lemmatization, tokenizer, named entity recognition (NER), and entity resolver. For example, the document analyzer 204 parses and tokenizes the documents to generate tokens which are discrete units of text data that are delimited by one or more of spaces or symbols in the documents. Thus, a sentence including words may be tokenized so that each token corresponds to a word or a symbol. A token selector 206 is also included in the entity processor 104 for discarding tokens corresponding to stop words, whitespaces and the like so that tokens including meaningful entity names and values thereof are selected for further processing. Parsers which are currently used based on labelled training data or parsers which are to be invented may be used as the document analyzer 204 in accordance with examples described herein. After recognizing the entities, the entity resolution techniques are applied across documents or data associated with the input 114 to resolve the entity conflicts or multiple names that refer to the same entity.

Tokens processed by the entity processor 104 can have various data formats such as but not limited to, textual formats including names of places, people, organizations and the like, common nouns, dates, locations, numerical data including latitude and longitude or addresses, telephone or fax numbers, currency-related data such as prices or miscellaneous data including alpha-numeric data such as specific identifiers including Stock Keeping Units (SKU)s, International Standard Book Numbers (ISBN)s, bar codes, Quick Response (QR) codes, account numbers and the like. In an example, the tokens which are processed can also be tagged with parts of speech (POS) information for more accurate entity identification.

In an example, data from the document analyzer 204 including sentence structure information and the like can be used to obtain context associated with each of the tokens so that entities may be identified via context enrichment techniques. Referring back to the example of accessing an email from the input 114, the context for a particular name as a sender of the email, or the context information of another name as recipient may be gathered. Based on the email addresses of the sender and recipient, the customers and/or internal employees involved in the email exchange may be identified. Similarly, context information of a date can indicate it as a sent date while context information of one or more textual tokens may indicate their occurrence within the email subject line which can indicate the topic/items associated with the email. Frame-based information retrieval techniques can be also employed to derive the context information.

The entity categorizer 1224 receives the tokens and the related context data to identify one or more of entities and their respective values within the input 114. In an example, the entity categorizer 1224 can access a dictionary/corpus in order to identify synonyms for the words in the tokens in order to correctly identify the document object names. For example, the email may refer to an 'item' whereas the inventory database may include a field with a field name 'product'. When an entry for an 'item' is not found in one of the data sources 122-126 in further downstream processing, the information collected by the entity categorizer 1224 from the dictionary/corpus 120 can be used. The entity categorizer 1224 can include categorizer models/algorithms 2082. The categorizer models/algorithms 2082 may include but are not limited to classifier algorithms/models, clustering algorithms/models, and rule-based categorizers, which may be trained using labelled data, unlabeled data, or semi-labelled data. For example, the categorizer models/algorithms 2082 may include classification or clustering techniques in separating the tokens as entity names and/or respective values. The information from the entity categorizer 1224 is stored within one or more of the data structure(s) 116. In an example, the classifiers may include random forests trained on labelled data. The data structure(s) 116 can be tables storing entity names and respective values in accordance with an example.

Figure 3:
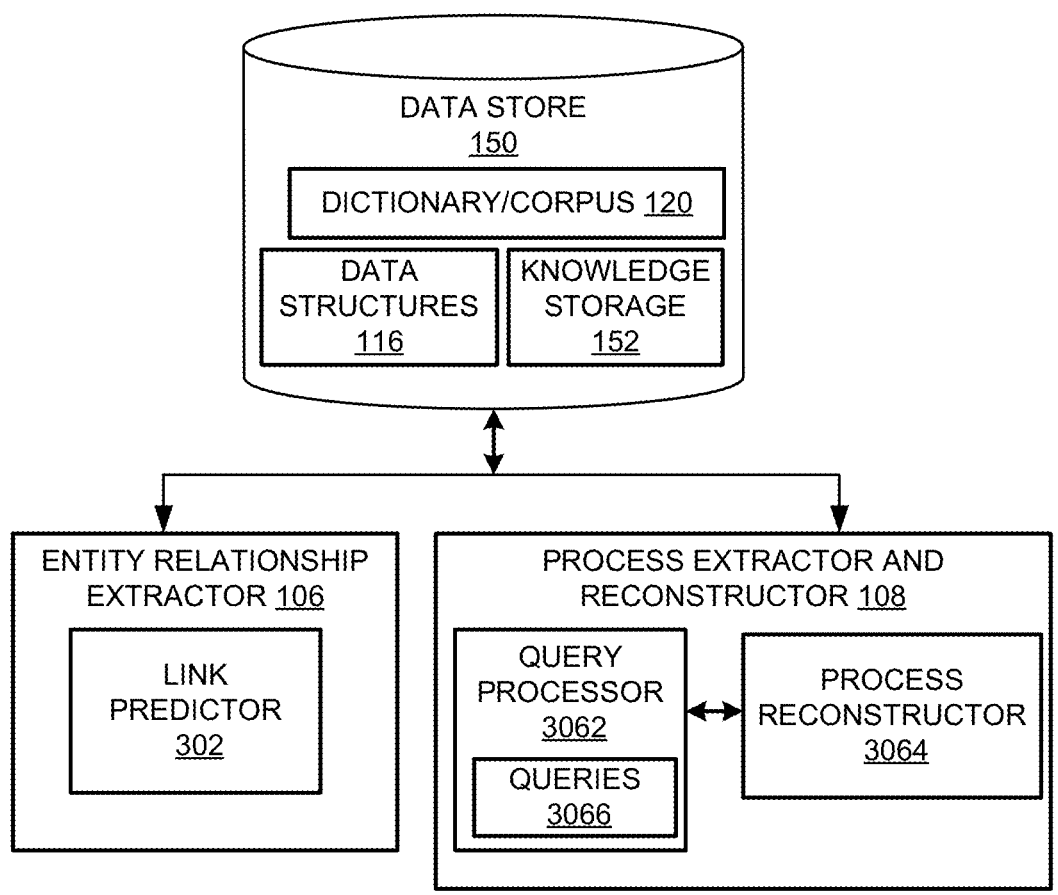
FIG. 3 is a block diagram of an entity relationship extractor and a process extractor and reconstructor in accordance with an example.

FIG. 3 is a block diagram of the entity relationship extractor 106 and the process extractor and reconstructor 108 in accordance with an example. The entity relationship extractor 106 employs the information from the data structure(s) 116 to infer relationships between the various entities. In addition, information from the data sources 122-126 can be employed to predict the links between the entities. Graphical models which encode dependencies between variables via representing the variables as nodes in a graph and dependencies between the variables as edges of the graph can be employed to infer the entity relationships. A link predictor 302 is configured to access the information from the data structure(s) to automatically extract triples using machine learning and natural language processing techniques. The triples may include two entities and the link or relationship between the entities. In an example, techniques including tensor factorization can be used for link prediction between entities.

The knowledge storage 152 thus generated can be further analyzed by the process extractor and reconstructor 108 to obtain various elements of the unstructured process referred to by the input 114. The process extractor and reconstructor 108 includes a query processor 3062 and a process reconstructor 3064. The query processor 3062 may be trained to obtain responses to pre-determined queries 3066 like who, what, when, where and how from the knowledge storage 152, based for example, on the entity categories of the entities. The pre-determined queries 3066 can be answered for example, via analysis of the links connecting the nodes which represent the entities in the knowledge storage 152. As mentioned herein, a process reconstructor 3064 can reconstruct the unstructured process, for example, by tracking the inputs and outputs of the unstructured process in a specific order, for example, in a chronological order. Thus, each step of the unstructured process may be determined by obtaining a response to the 'when' query for each input/output. The details of the steps may be further identified by obtaining responses to further queries such as but not limited to 'what', 'who', 'how' and the like.

Figure 4:
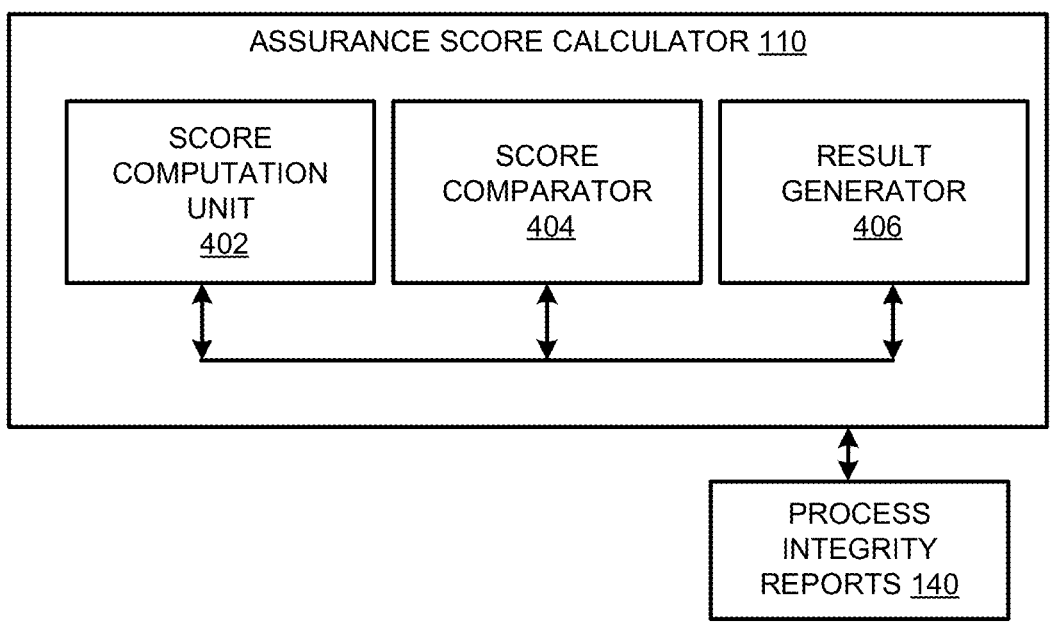
FIG. 4 is a block diagram of an assurance score calculator in accordance with examples discussed herein.

FIG. 4 is a block diagram of the assurance score calculator 110 in accordance with examples discussed herein. The assurance score calculator 110 includes a score computation unit 402, a score comparator 404 and a result generator 406. The score computation unit 402 is configured to calculate an integrity assurance score which determines the validity of the values of one or more of the entities. In an example, entity values which change dynamically during the execution of the unstructured process can be selected for determining the similarity between the information in the knowledge graphs 304 and the corresponding information in the data sources 122-126. If a finalized document was generated at the end of the unstructured process, then the similarity between the data in the finalized document and the corresponding data or corresponding values stored in one or more of the data sources 122-126 may be obtained. Through illustration and not limitation, if the final document includes a total transaction amount and partial transaction amounts from which the total transaction amount is calculated wherein a subset of the data sources include the partial transaction amounts, then the integrity assurance score is calculated based on the similarities between the final document and the subset of data sources including the partial amounts.

For a given unstructured process that is audited by the process integrity evaluation system 100, the score computation unit 402 is configured to calculate the integrity assurance score based on the similarity between the entity values obtained from the knowledge storage 152 including any entity values that may be calculated and the corresponding entity values stored in one or more of the data sources 122-126. Various similarity measures such as but not limited to, Jacob similarity, cosine similarity and the like can be used to calculate the similarity scores. In an example, the data structure 116 can include stored formulae when entity values need to be computed for one or more of the entities.

In an example, a similarity score obtained as a measure of comparison between the data extracted via the input 114 and the data previously stored in one or more of the data sources 122-126 can be termed as the integrity assurance score of the unstructured process. The similarity score thus obtained for a given data structure is compared by the score comparator 404 against an assurance score threshold (which can be predetermined, optimized by the cross validation, or trained by models, etc.) to determine the authenticity of the entity values contained in the data structures 116. The threshold score may be set for example, based on the number of entities whose values vary during the course of the unstructured process or the entities that have computed values. In an example, the assurance score threshold may be statistically determined based on observed data regarding correlation between the scores and accuracy of the audit results. For example, the assurance score threshold may be set at 50% so that an assurance score of greater than 50% indicates that the unstructured process and data generated from the unstructured process is accurate. In another example, the assurance score threshold can be obtained by machine learning algorithm training k-fold cross validation optimization, which can also be changed dynamically.

In an example, the score comparator 404 can have AI elements such as but not limited to classifiers. If the integrity assurance score of the data structure fails to meet the assurance score threshold, then the unstructured process would be flagged for further processing with primary reasons in specific areas comparing to the internal records, including inaccurate, inconsistent, or insufficient, etc. The final results from the audit or the integrity evaluation procedure may be fed back to the score comparator 404 to train the classifiers thereby improving the accuracy of the audit in accordance with an example. The results from the assurance score calculator 110 are made accessible to the result generator 406 to enable producing one or more process integrity reports 140 that include the result of the auditing procedure conducted on the unstructured process.

Figure 5:
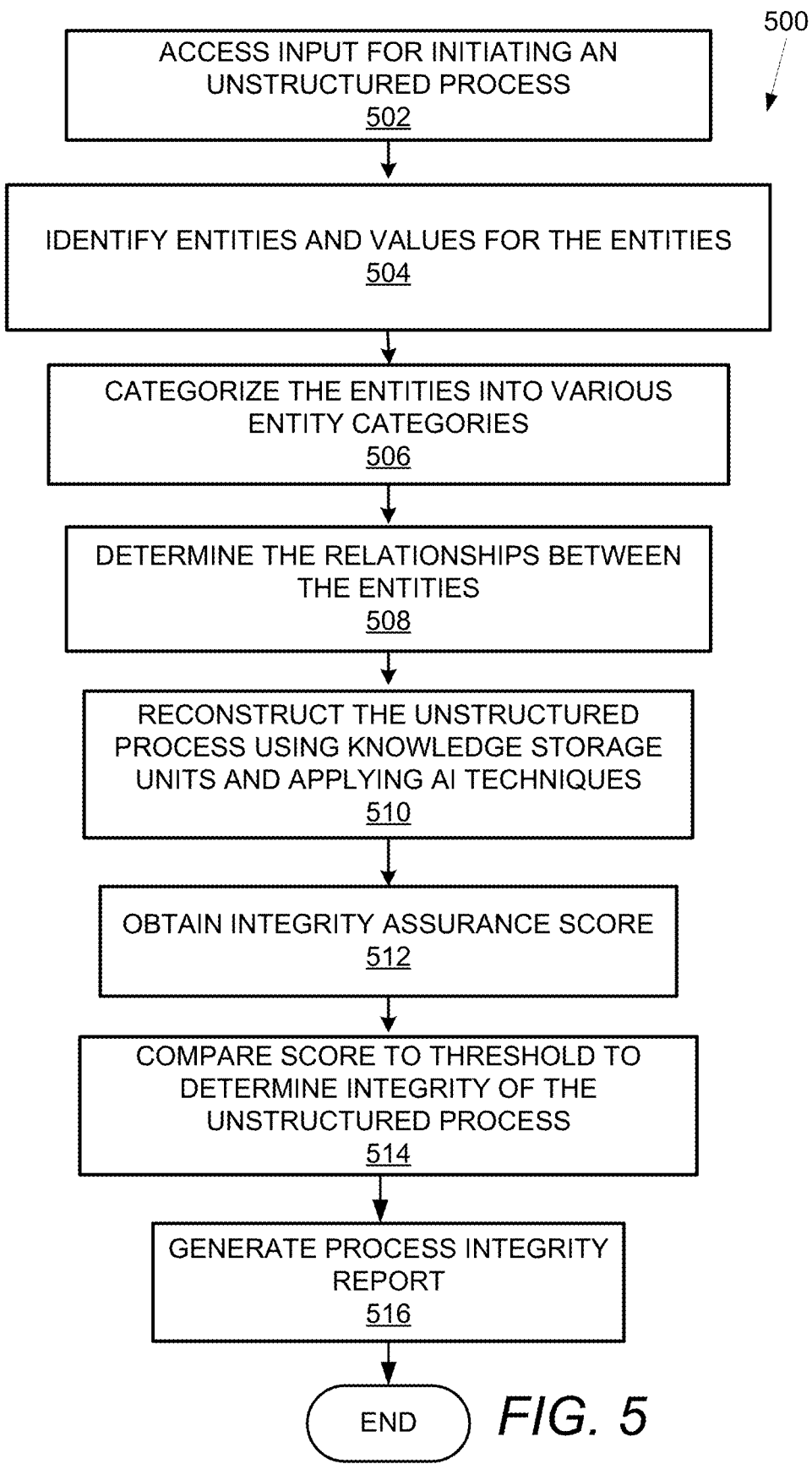
FIG. 5 is a flowchart that details a method of process integrity evaluation or auditing of an unstructured process in accordance with an example.

FIG. 5 is a flowchart 500 that details a method of integrity evaluation or auditing of an unstructured process in accordance with an example. The method begins at 502 wherein an input associated with the unstructured process in the form of the input 114 is accessed. In an example, integrity evaluation of the unstructured process can be initiated by providing a finalized extracted document to at least one of the data sources 122-126. In another example, an audit application or other external application may programmatically trigger the process integrity evaluation system 100 to begin an auditing/evaluation procedure. At 504, the entities and the respective values for the entities are identified by analyzing data associated with the input 114 in accordance with examples disclosed herein. The entities are categorized or classified at 506 into various entity categories such as but not limited to names, locations, dates, numbers, miscellaneous entries such as identification codes including alphabetic, numeric and/or alpha-numeric codes and the like. At 508, the relationship between the entities are determined using various techniques such as but not limited to tensor factorization. The relationships between the entities can be represented by the knowledge storage 152. The unstructured process can be reconstructed at 510 by obtaining answers to questions like who, what, when, where, why, how and the like from the knowledge storage 152. As each step of an unstructured process is determined by the output from prior steps, the exact queries that are to be used for the process reconstruction may be selected automatically using AI techniques such as but not limited to neural networks. In an example, LSTM a recurrent neural network may be employed for the process reconstruction.

At 512, an integrity assurance score such as but not limited to a similarity score is obtained between data stored in one or more knowledge storage 152 and the data stored in one or more of the data sources 122-126. The integrity assurance score could be similarity score, which can be obtained using a Jacob similarity matrix or a cosine similarity matrix. At 514, the integrity assurance score is compared to an assurance score threshold and a process integrity report including the result of the comparison is generated at 516. If the integrity assurance score is greater than the assurance score threshold, it implies that the data processed through the unstructured process is consistent. Hence, the audit report or the process integrity report confirms the integrity of the unstructured process and that no process step, input, output or document has been manipulated or is otherwise inaccurate. If the integrity assurance score is less than the assurance score threshold, the process integrity report conveys that one or more steps of the unstructured process have been tampered with and hence inconsistencies have crept into the unstructured process. In an example, remediation can be executed if there is found to be a discrepancy in the unstructured process. For example, a refund may be initiated for an erroneous overcharge or a collection procedure can be initiated for an erroneous payment and the like. The process evaluation method then terminates on the end block.

Figure 6:
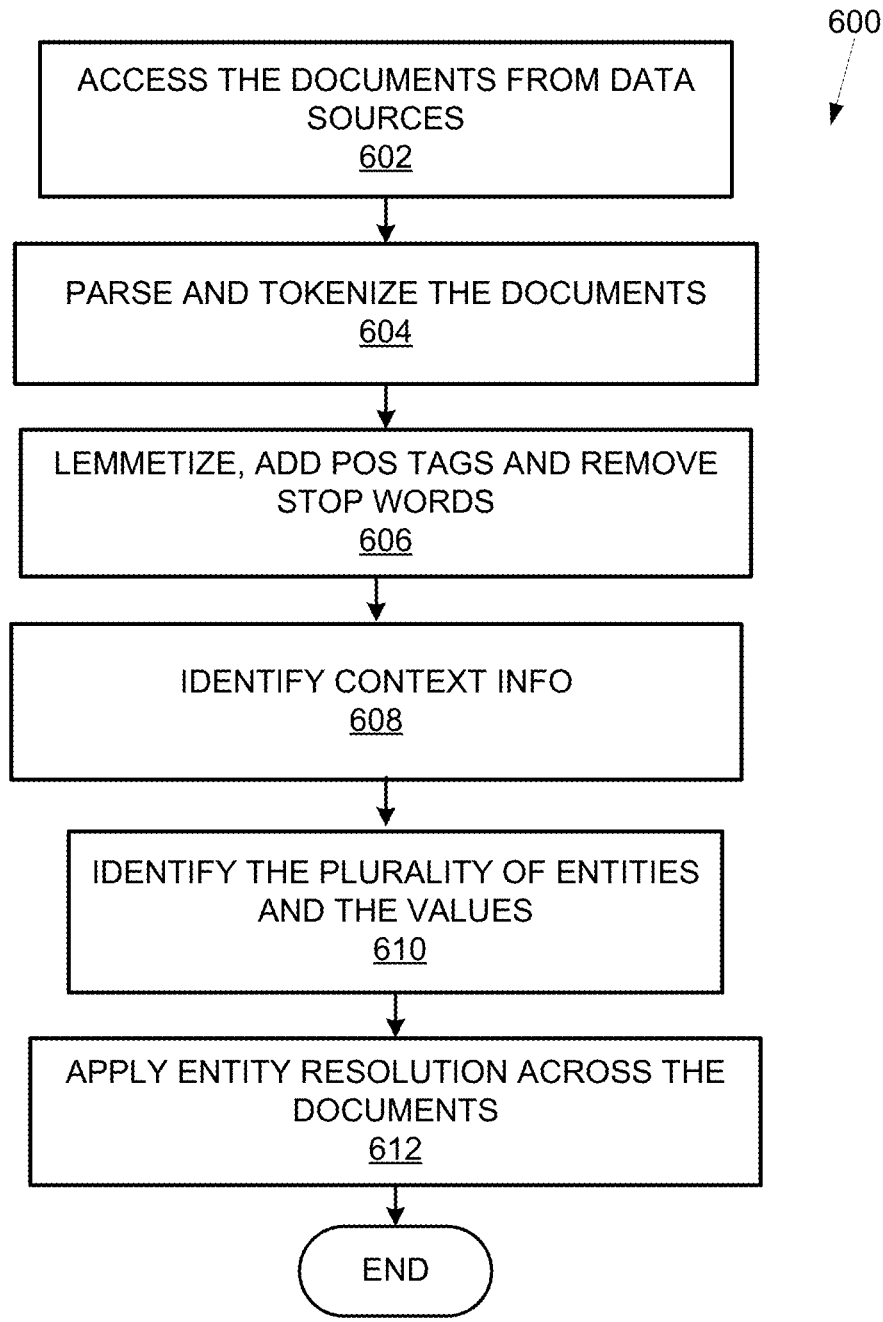
FIG. 6 is a flowchart that details a method of identifying the entities from the unstructured data in accordance with examples disclosed herein.

FIG. 6 is a flowchart 600 that details a method of identifying the entities from the input 114 in accordance with examples disclosed herein. The method begins at 602 wherein one or more documents associated with the input are accessed by the entity processor 104. In an example, the input 114 can include or enable access to one or more of an email, a document, an image and the like retrieved by the process integrity evaluation system 100 from one or more of the data sources 122-126. In another example, the input 114 may be any document including a word processor document, a spreadsheet, a database table and the like. At 604, the input 114 is parsed to obtain various tokens. The tokens are analyzed at 606 to remove stop words, punctuation marks and the like. Furthermore, the data formats of the textual data within the various tokens are identified and the tokens may also be lemmatized and tagged with the POS information at 606. The context information of the tokens is gathered at 608. In an example, the frame/dictionary based information retrieval (IR) techniques wherein the content and organization of the input 114 stored in frame objects can be employed for obtaining the entities. At 610, trained classifiers are employed to identify from the tokens, the entities and the values corresponding to the entities. The information produced by the entity processor 104 such as the tokens, the metadata of the tokens including the POS information and the like can be stored in the data store 150 for further downstream procedures. After recognizing the entities and identifying their values, the entity resolution 612 is applied across the documents to resolve the entity conflicts or the multiple names referring to the same entity. In an example, the extracted entities, such as "Apple" and "Apple Inc.", "Banana" and "Banana Republic", can be distinguished as "Apple is a fruit name", "Apple Inc. is a company name", "Banana is a fruit name", "Banana Republic is a company name" by entity resolution techniques. In another example, the extracted entities, such as "Donald Trump", "Donald J. Trump", "President Trump", can be recognized as the same entity in a resolved form (e.g., Donald Trump).

Figure 7:
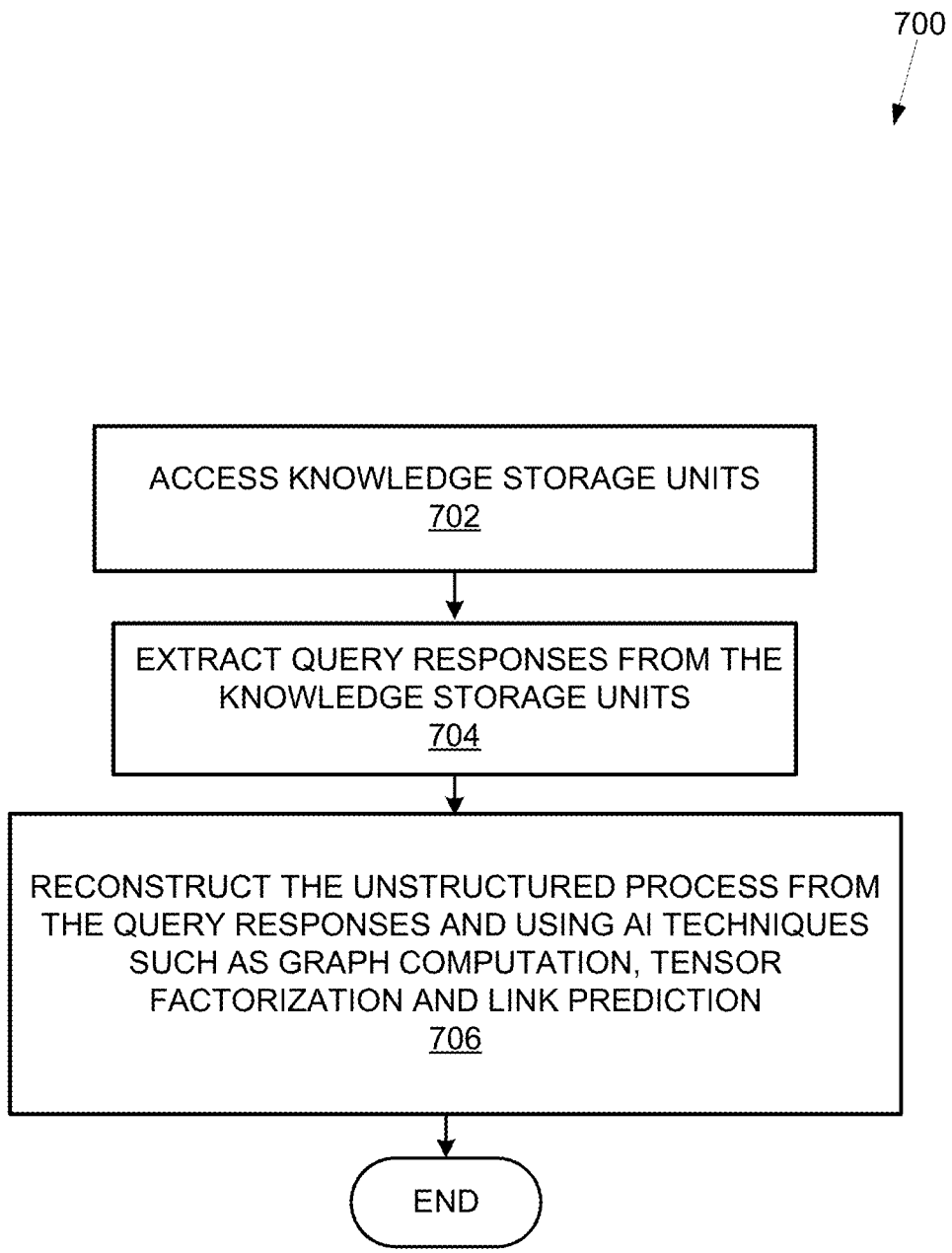
FIG. 7 is a flowchart that details a method of determining the relationships between the entities and hence reconstructing the unstructured process in accordance with examples described herein.

FIG. 7 is a flowchart 700 that details a method of determining the relationships between the entities and hence reconstructing the unstructured process in accordance with examples described herein. The method begins at 702 with the process extractor and reconstructor 108 gaining access to the knowledge storage 152 such as but not limited to knowledge graphs. As mentioned above, knowledge storage 152 is built which represents the entities, the entity values and the relationships between the entities. Various automatic or semi-automatic methods can be employed for building the knowledge storage 152 including the knowledge graphs. In particular, artificial intelligence techniques, including graph computation, tensor factorization, link prediction, etc. may be used. Through illustration and not limitation, triples of two entities and the relationship therebetween can be automatically extracted via machine learning (ML) and NLP techniques from the text of the input 114 or from the tokens obtained by the entity processor 104. In an example, N-grams can be used for mining the textual data. The knowledge storage 152 thus built can be used at 704 to extract answers to queries such as who, what, where, when, how and the like. The unstructured process can thereby be reconstructed at 706 based on the query responses and AI techniques in accordance with examples discussed herein.

Figure 8:
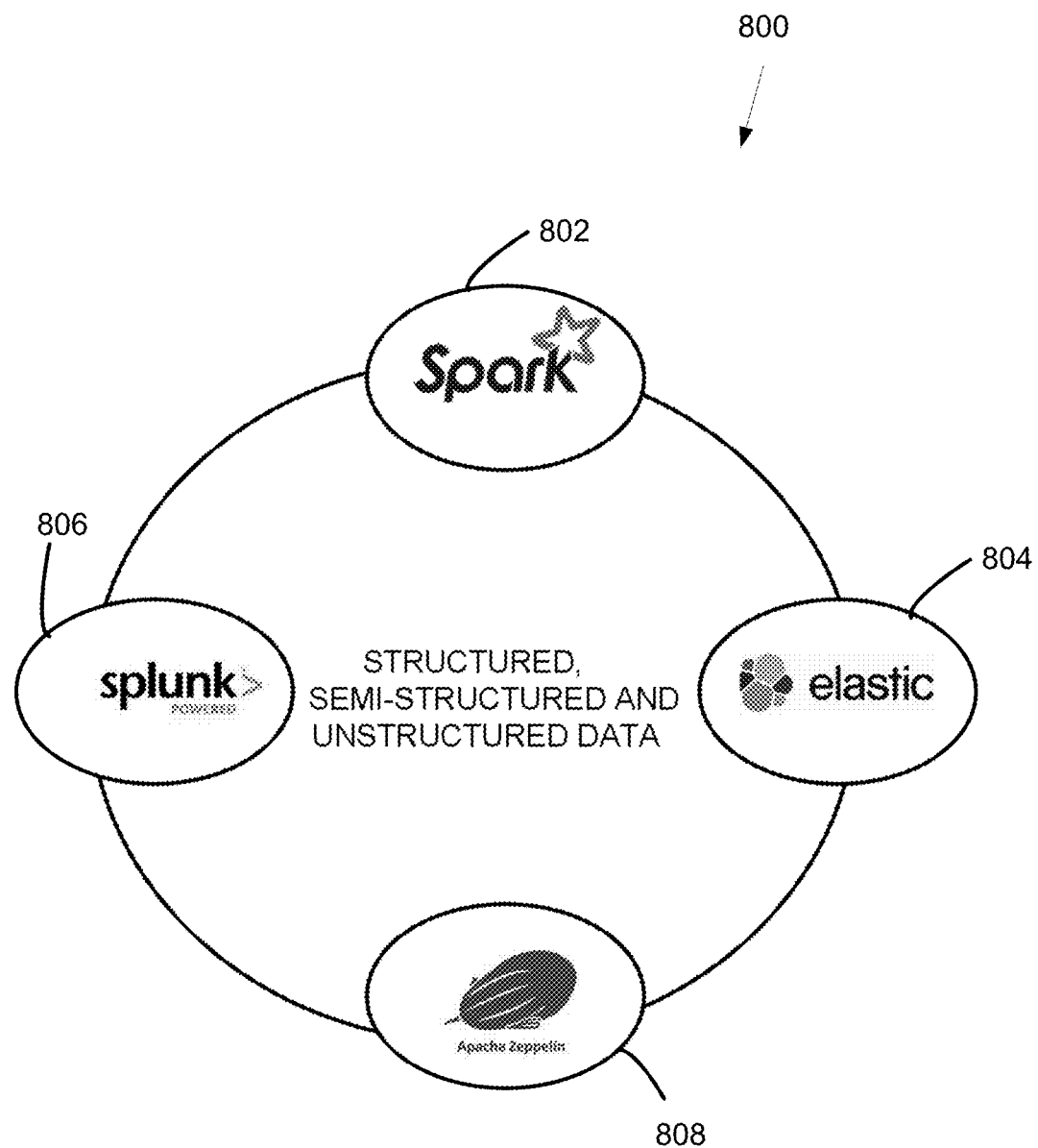
FIG. 8 shows a schematic diagram of the technologies employed to build the process integrity evaluation system.

FIG. 8 is a schematic diagram 800 showing the various technological platforms employed for building and operating the process integrity evaluation system 100 in accordance with examples disclosed herein. The technologies provide information infrastructure that enables the process integrity evaluation system 100 to evaluate processes at a massive scale. Apache Spark 802 can be employed for building machine learning algorithms that are used in entity extraction, entity categorization, entity resolution, entity relationship extraction and process extraction and reconstruction. An advantage of Apache Spark is its scalability. Elasticsearch 804 and SPLUNK 806 can be used for raw data storage, feature and metadata generation, indexing and knowledge graph generation and processing. The platforms provide secure storage, which are also scalable. Apache Zeppelin 808 is a scalable platform that enables generating visualizations in various formats such as but not limited to charts, trees and maps.

Below is described a use case which illustrates via FIGS. 9A and 9B the example methods of process integrity evaluation and scoring discussed herein. It can be appreciated that the use case is discussed below solely via illustration and is not limiting. In this example, emails 900 and 950 are exchanged between a product supplier and a product seller. The email from the product supplier 900 provides information regarding a discount on a particular product for a limited time period. The product seller responds with an email 950 that includes the total number of units at various points of the supply chain and calculates the total amount to be settled in the contract. Below is a description of an auditing procedure executed by the process integrity evaluation system 100 of the unstructured process of the limited-time discount on the product in accordance with examples disclosed herein.

FIG. 9A shows the email 900 from the product supplier/sender 902 to a product seller/recipient 904. When the email 900 is processed by the entity processor 104, various tokens are generated. The tokens include entities names such as the sender, recipient, product and the like. In addition, the tokens may also include entity values such as the sender's name 902, sender's company 906, the recipient's name 904, the recipient's company 908, the date the email was sent, an effective date 910, product name 912, product ID 914, discounted amount 916 and final price 918. Based on the subject line 920, the product name 912 and the product ID 914, it can be determined that the email refers to a specific product. From further analysis of the email text using, for example NLP techniques, it can be determined that the email 900 relates to discounting a particular product. Furthermore, analysis of tokens 922, 924 and 926 and the text connecting these tokens allows for a determination regarding an actionable item namely, the contract amendment.

FIG. 9B is a response email 950 from the product seller/recipient 904 (who is now the sender) to the product supplier/sender 902 (who will now be the recipient) acknowledging the email 900 and providing information regarding the total number of units at various locations/ points of the supply chain and the amendment of the contract. The entity processor 104 analyses the response email 950 in a manner similar to the email 900 to extract tokens and identify the entities and the entity values from the response email 950. Based on the extracted entities and the entity values from the emails 900 and 950, one or more data structures can be built which are analyzed to obtain the relationships between the entities and to reconstruct the unstructured process.

FIG. 10 shows the data structures 116 in the form of a table 1000 and a table 1050 that are obtained by analyzing the emails 900 and 950 by the entity processor 104. As seen from FIG. 10, the table 1000 includes entities 1002 and their respective values 1004. Similarly, the table 1050 includes entities 1052 and their respective values 1054. The tables 1000, 1050 are automatically built by the entity processor 104 using data parsers with ML and NLP techniques as described supra. The tables 1000 and 1050 enable the entity relationship extractor 106 and the process extractor and reconstructor 108 to derive relationships between the various entities and thereby reconstruct the unstructured process.

Figure 11A:
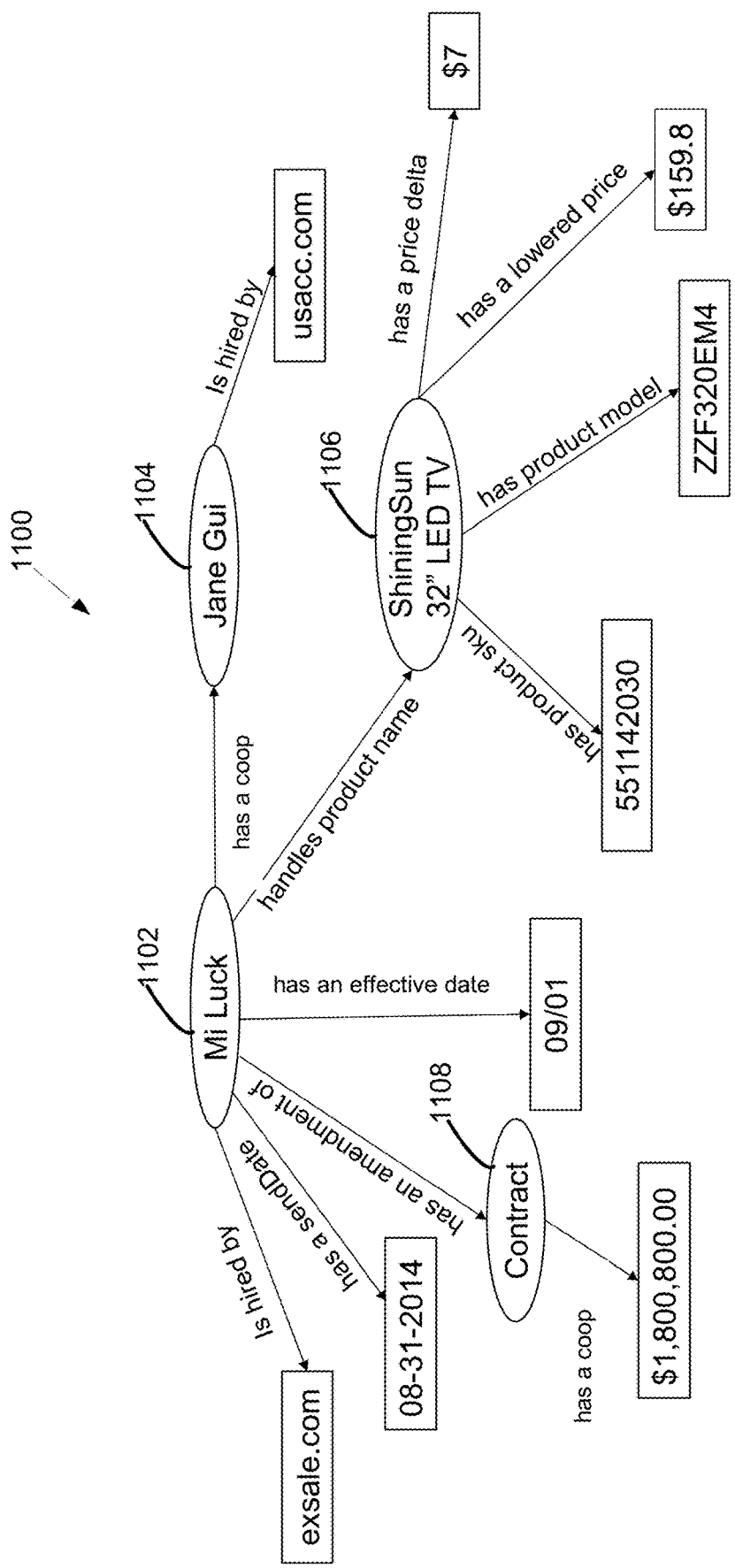
FIG. 11A shows an example of a knowledge storage (knowledge graph) extracted from the email in FIG. 9A in accordance with the methods disclosed herein.

FIG. 11A shows an example of a knowledge graph 1100 created from the email 900 by the entity relationship extractor 106 and the process extractor and reconstructor 108 using techniques such as but not limited to tensor factorization in accordance with the methods disclosed herein. The knowledge graph 1100 includes entities pertaining to an email sender 1102, an entity pertaining to the email recipient 1104, an entity pertaining to the product 1106 and an entity pertaining to an actionable item in the email, namely the contract 1108. Each of the entities 1102, 1104, 1106 and 1108 has various attributes. For example, the attributes of the sender entity 1102 include an employer attribute having a value 'exsale.com', a sendDate attribute having a value of '08-31-2014' and an effectiveDate attribute having a value of '09/01'. In addition, the sender entity 1102 is connected to other entities via various relationships. For example, the sender entity 1102 is connected to the contract entity 1108 as the contract 'is to be amended'. Similarly, the sender entity 1102 has a relationship with the product entity 1106 as the sender 'handles the product' and the sender is connected to the recipient entity 1104 by selecting 'the recipient for the email' 900.

Figure 11B:
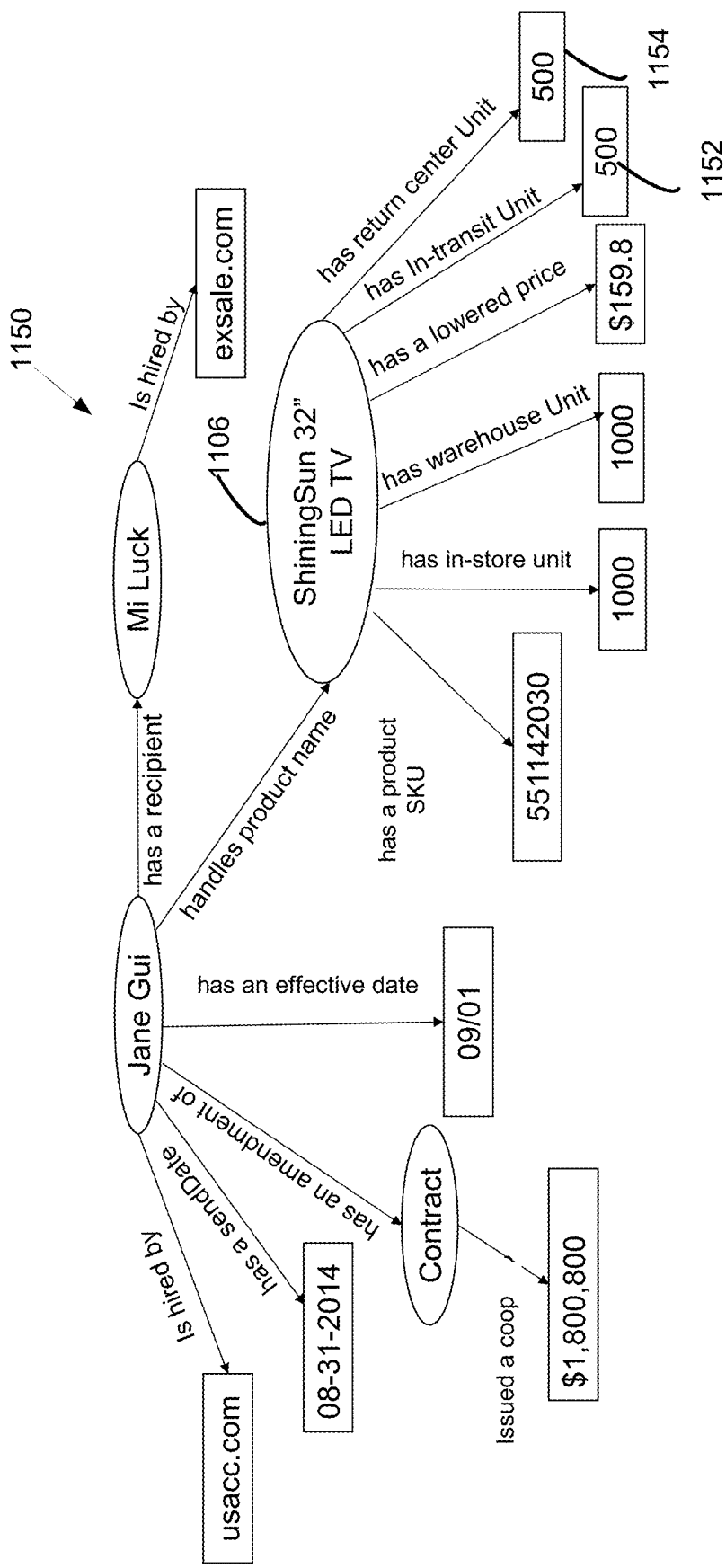
FIG. 11B shows another example of a knowledge storage (knowledge graph) extracted from the email in FIG. 9B in accordance with the methods disclosed herein.

Similarly, FIG. 11B shows another example knowledge graph 1150 extracted from the email 950 in accordance with the methods disclosed herein. The knowledge graph 1150 has similar entities as the knowledge graph 1100 except for the interchange between the sender entity and the recipient entity. It can be appreciated that this is not always the case and that a knowledge graph generated from a document may have unique entities which are not present in other knowledge graphs generated from other documents accessed or generated during the same unstructured process. For example, the entity pertaining to the product 1106 includes additional attributes of units in transit 1152 and units in return center 1154.

The knowledge graphs 1100 and 1150 thus generated can provide responses to the various questions such as where, what, when, who and the like which enables the process formulator to reconstruct the unstructured process. For example, extracting the responses to such questions from the knowledge graphs 1100 and 1150 can lead to reconstructing the unstructured process of amending the contract by the process extractor and reconstructor 108 based on the amounts exchanged in emails between the sender 902 and the recipient 904. The stored formulae used in the unstructured process modeled by the knowledge graphs 1100 and 1150 to obtain the values for the total units and total due attributes, are shown below:

$$\text{Total Units} = \text{In-store} + \text{warehouse} + \text{In-transit} + \text{return center} \quad \text{Eq. (1)}$$

$$\text{Total Due} = (\text{New Price} - \text{Old Price}) * \text{Total Unit} \quad \text{Eq. (2)}$$

In an example, the Total Units and the Total Due attributes may be calculated using the data from the internal records such as one or more of the data sources 122-126. Therefore, the process integrity evaluation system 100 estimates the integrity assurance score between information from the knowledge graphs 1100, 1150, and the values that are calculated based on the values stored in the internal records or the data sources 122-126. In this example, the data sources 122-126 can include but are not limited to, a warehouse database, an inventory center database, in-transit database, transaction-related databases such as sales databases, returns databases and the like. The integrity assurance score is compared to an assurance score threshold so that if the integrity assurance score is greater than the assurance score threshold, the integrity of the unstructured process associated therewith can be confirmed and that the contract amended per the amount in the knowledge graphs 1100 and 1150 is valid and consistent with the data in the internal records.

FIG. 12 shows a data structure 1200 including entities and entity values where were extracted in the evaluation of the unstructured process discussed above. The entity values may be compared to internal record documents which may be stored in one or more of the data sources 122-126 in order to obtain the integrity assurance score. Based on the comparison of the integrity assurance score with an assurance score threshold, a process integrity report including the validity or invalidity of the corresponding unstructured process would be generated.

Figure 13:
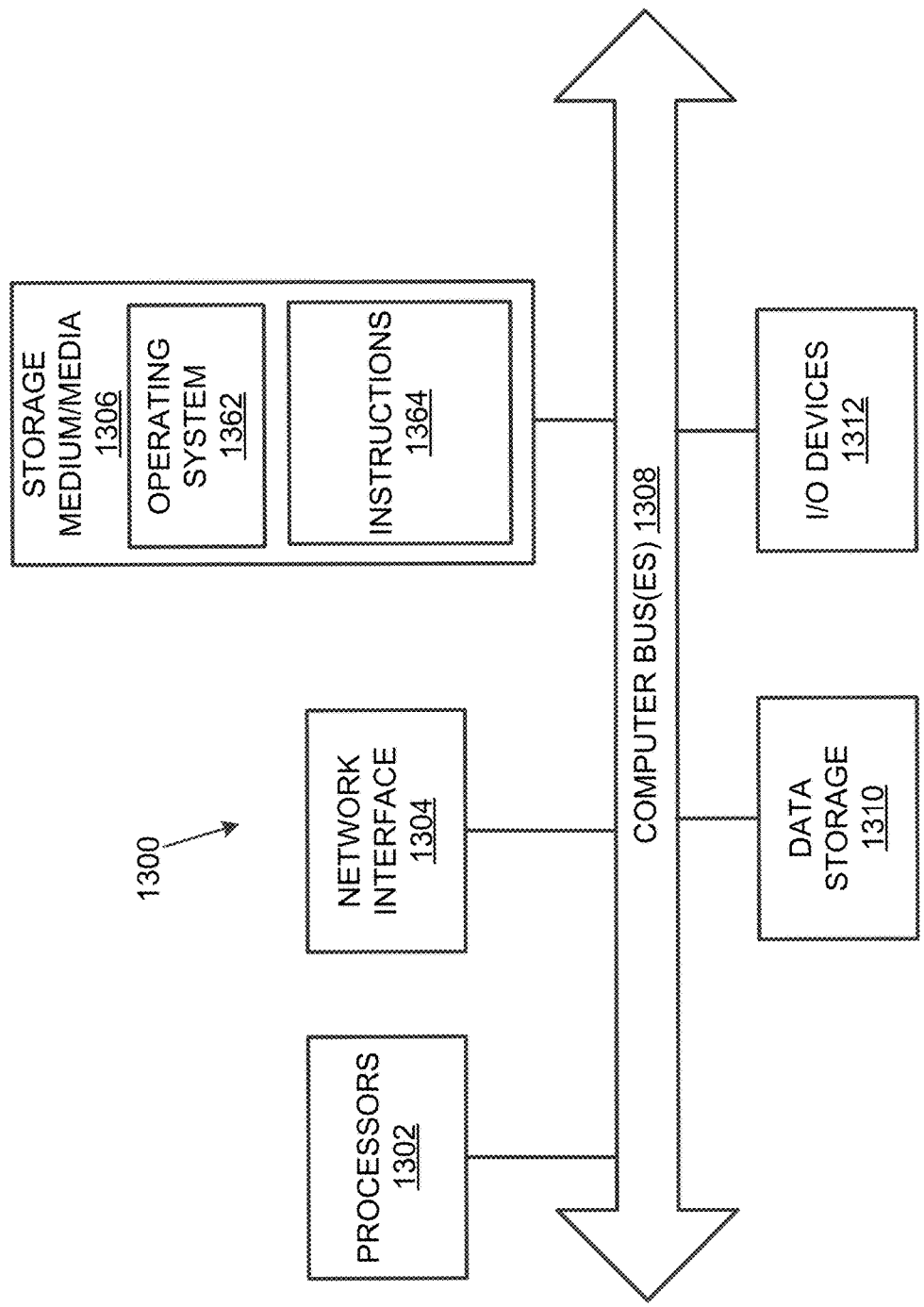
FIG. 13 illustrates a computer system that may be used to implement the process integrity evaluation system.

FIG. 13 illustrates a computer system 1300 that may be used to implement the process integrity evaluation system 100. More particularly, computing machines such as but not limited to internal/external server clusters, desktops, laptops, smartphones, tablets and wearables which may be used to execute the process integrity evaluation system 100 or may have the structure of the computer system 1300. The computer system 1300 may include additional components not shown and that some of the components described may be removed and/or modified. In another example, a computer system can sit on external-cloud platforms including Amazon Web Services, or internal corporate cloud computing clusters, or organizational computing resources, etc.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless 802.11x LAN, a 3G or 4G mobile WAN or a WiMax WAN, and a computer-readable medium 1306. Each of these components may be operatively coupled to a bus 1308. The computer-readable medium 1306 may be any suitable medium which participates in providing instructions to the processor(s) 1302 for execution. For example, the computer-readable medium 1306 may be or a non-transitory computer readable medium or a non-volatile computer readable medium, such as a magnetic disk or solid-state non-volatile memory or volatile medium such as RAM. The instructions or modules stored on the computer-readable medium 1306 may include machine-readable instructions 1364 executed by the processor(s) 1302 to perform the methods and functions of the process integrity evaluation system 100.

The process integrity evaluation system 100 may be implemented as software stored on a non-transitory computer-readable medium and executed by one or more processors. For example, the computer-readable medium 1306 may store an operating system 1362, such as MAC OS, MS WINDOWS, UNIX, or LINUX, and code 1364 for the process integrity evaluation system 100. The operating system 1362 may be multi-user, multiprocessing, multitasking, multithreading, real-time and the like. For example, during runtime, the operating system 1362 is running and the code for the process integrity evaluation system 100 is executed by the processor(s) 1302.

The computer system 1300 may include a data storage 1310, which may include non-volatile data storage. The data storage 1310 stores any data used by the process integrity evaluation system 100. The data storage 1310 may be used to store the dictionary 120, the data structures 116, knowledge storage 152 and the like.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions and figures used herein are set forth via illustration only and are not meant as limitations. Many variations are possible within the spirit and scope of the subject matter, which is intended to be defined by the following claims and their equivalents.

What is claimed is:

1. A process integrity evaluation system that evaluates an unstructured process comprising:
   at least one processor;
   a non-transitory computer-readable medium storing machine-readable instructions that cause the at least one processor to:
   receive at least one input including data associated with the unstructured process that includes a plurality of process steps wherein each process step of the plurality of process steps except a first process step of the unstructured process is determined at process execution based on an output of a prior process step;
   verify integrity of the data obtained from the input, wherein the data is from data sources of different data formats and the data is one of historical data, real-time data and live streaming data;
   extract a plurality of entities and attribute values of the plurality of entities from the at least one input;
   categorize the plurality of entities into one or more entity categories;
   determine relationships among the plurality of entities;
   build one or more data structures in a knowledge storage that store the plurality of entities, the attribute values and the relationships between the plurality of entities;
   train a neural network in automatic query selection of different query types;
   automatically select by the trained neural network, one or more queries that enable reconstruction of completed process steps of the plurality of process steps of the unstructured process from the knowledge storage, wherein the automatically selected queries include at least temporal queries;
   extract responses to the automatically selected queries from the knowledge storage wherein the responses to the different query types are obtained based on the one or more entity categories;
   trace the completed process steps of the plurality of process steps of the unstructured process by analyzing links between the plurality of entities of the unstructured process in a temporal sequence, wherein the links are analyzed based on the responses to the temporal queries;
   reconstruct the unstructured process from the knowledge storage, wherein the unstructured process is reconstructed by tracking inputs and outputs of the completed process steps based on the tracing of the completed process steps in a chronological order;
   compute and obtain an integrity assurance score based on the attribute values that are accessed or changed dynamically during the execution of the unstructured process and corresponding values stored in the data sources;
   determine that the unstructured process is valid upon the integrity assurance score being greater than an assurance score threshold;
   determine that one or more steps of the unstructured process are inaccurate with primary reasons in specific areas upon the integrity assurance score being less than the assurance score threshold; and
   initiate remediation when the unstructured process is determined to be inaccurate; and
   generate reports that aggregate a number of executed process integrity evaluation tasks.

2. The process integrity evaluation system of claim 1, wherein the assurance score threshold is predetermined by machine learning models.

3. The process integrity evaluation system of claim 1, wherein the instructions to extract entities further comprise instructions that cause the processor to:
   parse and tokenize at least one document associated with the at least one input; and
   recognize the entities, identify the attribute values, and conduct entity resolutions.

4. The process integrity evaluation system of claim 3, wherein the instructions to extract the entities further comprise instructions that cause the processor to:
   employ artificial intelligence (AI) techniques that identify the entities and the attribute values from an output obtained upon the parsing and tokenization of the at least one document.

5. The process integrity evaluation system of claim 1, wherein the instructions to categorize the entities into the one or more entity categories further comprise instructions that cause the processor to:
   categorize the plurality of entities into the one or more entity categories to differentiate between the one or more entity categories that include at least locations, names, dates, amounts and identifiers.

6. The process integrity evaluation system of claim 1, wherein the instructions for storing the entities, the attribute values, and the entity relationships further comprise instructions that cause the processor to:
   employ tensor factorization for predicting the links between the plurality of entities.

7. The process integrity evaluation system of claim 1, wherein the instructions to obtain an integrity assurance score for one or more of the attribute values further comprise instructions that cause the processor to:

calculate similarity between the attribute values obtained from the input and corresponding values stored in the data sources; and compare the similarity to a similarity threshold.

8. The process integrity evaluation system of claim 1, further comprising instructions that cause the processor to:
generate a report with primary failure reasons in specific areas.

9. The process integrity evaluation system of claim 1, wherein the data sources include at least departmental data sources and system data sources.

10. The process integrity evaluation system of claim 1, wherein the data integrity verification comprises multiple sources check, cross-channel consolidation and outlier detection techniques.

11. The process integrity evaluation system of claim 1, wherein the instructions to build the one or more data structures in the knowledge storage further comprise instructions that cause the processor to:
build the one or more data structures that include knowledge graphs via obtaining triples including at least two entities and the relationship between the two entities from tokens extracted from the input.

12. The process integrity evaluation system of claim 1, wherein the instructions to reconstruct the process steps of the unstructured process further comprise instructions that cause the processor to:
determine the temporal sequence of each of the completed steps of the unstructured process by extracting the responses to a 'when' query.

13. A method of automatically evaluating an unstructured process comprising:
accessing inputs that pertain to the unstructured process that includes a plurality of process steps wherein each process step of the plurality of process steps except a first process step of the unstructured process is determined at process execution based on output of a prior process step;
processing the inputs to obtain a plurality of entities and attribute values of the entities;
categorizing the plurality of entities into one or more entity categories;
building respective data structures that store for each of the inputs, the plurality of entities, and respective attribute values of the plurality of entities;
storing the data structures within a knowledge storage corresponding to each of the inputs, the knowledge storage being constructed based on link predictions between the plurality of entities;
training a neural network in automatic query selection of different query types;
automatically selecting by the trained neural network, one or more queries that enable reconstruction of completed process steps of the plurality of process steps of the unstructured process from the knowledge storage, wherein the automatic ally selected queries include at least temporal queries;
extracting responses to the automatically selected queries from the one or more data structures in the knowledge storage wherein the responses to the different query types are obtained based on the one or more entity categories;
tracing the completed process steps of the plurality of process steps of the unstructured process by analyzing one or more of the links between the plurality of entities that are associated with the completed process steps in a temporal sequence, wherein the one or more links are analyzed based on the responses to the temporal queries;
reconstructing the unstructured process from the knowledge storage, wherein the unstructured process is reconstructed by tracking inputs and outputs of the completed process steps based on the tracing of the completed process steps in a chronological order;
calculating an integrity assurance score for one or more of the entity values extracted from the inputs, the integrity assurance score based on a similarity of the one or more entity values that are acce s sed or changed dynamically during the execution of the unstructured process and corresponding values stored in data sources;
comparing the integrity assurance score with an assurance score threshold;
determining that the unstructured process is accurate if the integrity assurance score is greater than the assurance score threshold, else generating a report with primary failure reasons in specific areas; and
generating reports that aggregate a number of executed process integrity evaluation tasks.

14. The method of claim 13, wherein the inputs include one or more of structured data, semi-structured data and unstructured data.

15. The method of claim 13, wherein the integrity assurance score calculation comprises employing one or more of document similarity, graph similarity, Jacob similarity matrix, and Cosine similarity matrix.

16. A non-transitory device storage medium comprising machine-readable instructions that cause a processor to:
receive at least one input including data associated with an unstructured process including a plurality of process steps wherein each process step of the plurality of process steps except a first process step of the unstructured process is determined at process execution based on output of a prior process step;
verify integrity of the data obtained from the input, wherein the data is from data sources having data of different data formats and the data is one of historical data, real-time data and live streaming data;
extract a plurality of entities and attribute values of the plurality of entities from the at least one input;
categorize the plurality of entities into one or more entity categories;
determine relationships among the plurality of entities;
build one or more data structures in a knowledge storage that store the plurality of entities, the attribute values and the relationships between the plurality of entities;
train a neural network in automatic query selection of different query types;
automatically select by the trained neural network, one or more queries that enable reconstruction of completed process steps of the unstructured process from the knowledge storage, wherein the automatically selected queries include at least temporal queries;
extract responses to the automatically selected queries from the one or more data structures in the knowledge storage wherein the responses to the different query types are obtained based on the one or more entity categories;
trace the completed process steps of the plurality of process steps of the unstructured process by analyzing links between the plurality of entities associated with the completed process steps in a temporal sequence, wherein the links are analyzed based on the responses to the temporal queries;

reconstruct the unstructured process from the knowledge storage, wherein the unstructured process is reconstructed by tracking inputs and outputs of the completed process steps based on the tracing of the completed process steps in a chronological order;

compute and obtain an integrity assurance score based on the entity values that are accessed or changed dynamically during the execution of the unstructured process and corresponding values stored in the data sources;

determine that the unstructured process is valid upon the integrity assurance score being greater than an assurance score threshold;

determine that one or more steps of the unstructured process are inaccurate with primary reasons in specific areas upon the integrity assurance score being less than the assurance score threshold;

initiate remediation when the unstructured process is determined to be inaccurate; and generate reports that aggregate a number of executed process integrity evaluation tasks.

17. The non-transitory device storage medium of claim 16, wherein the instructions for extracting the entities and the values of the entities further comprise-machine-readable instructions that cause the processor to:

parse and tokenize at least one document associated with the input; and recognize the plurality of entities, identify the attribute values, and conduct entity resolutions.

18. The non-transitory device storage medium of claim 16, wherein the instructions for obtaining the integrity assurance score further comprise instructions that cause the processor to:

employ one or more of document similarity, graph similarity, Jacob similarity matrix, and Cosine similarity matrix to calculate the integrity assurance score.

* * * * *